US010863329B2

(12) United States Patent
Ellis et al.

(10) Patent No.: US 10,863,329 B2
(45) Date of Patent: Dec. 8, 2020

(54) METHODS AND APPARATUS FOR CONDITIONAL CLASSIFIER CHAINING IN A CONSTRAINED MACHINE LEARNING ENVIRONMENT

(71) Applicant: Intel Corporation, Santa Clara, CA (US)

(72) Inventors: Keith A. Ellis, Carlow (IE); Giovani Estrada, Dublin (IE); David Coates, Leixlip (IE); Michael Nolan, Maynooth (IE)

(73) Assignee: Intel Corporation, Santa Clara, CA (US)

( * ) Notice: Subject to any disclaimer, the term of this patent is extended or adjusted under 35 U.S.C. 154(b) by 57 days.

(21) Appl. No.: 16/226,131

(22) Filed: Dec. 19, 2018

(65) Prior Publication Data

US 2019/0124488 A1  Apr. 25, 2019

(51) Int. Cl.
| | | |
|---|---|---|
| *H04L 29/08* | (2006.01) | |
| *H04W 4/38* | (2018.01) | |
| *G06F 13/16* | (2006.01) | |
| *G06K 9/62* | (2006.01) | |
| *G06N 20/00* | (2019.01) | |
| *H04L 12/24* | (2006.01) | |

(52) U.S. Cl.
CPC .......... *H04W 4/38* (2018.02); *G06F 13/1668* (2013.01); *G06K 9/626* (2013.01); *G06N 20/00* (2019.01); *H04L 41/12* (2013.01); *H04L 41/145* (2013.01); *H04L 67/10* (2013.01); *H04L 67/12* (2013.01); *H04L 67/125* (2013.01); *H04L 67/16* (2013.01)

(58) Field of Classification Search
CPC ..... H04L 67/10; H04L 67/1097; H04L 67/22; H04L 67/12; H04L 67/16; H04L 67/125; H04L 41/145; H04L 41/12; G06N 20/00; H04W 4/38; G06F 13/1668; G06K 9/626
See application file for complete search history.

(56) References Cited

U.S. PATENT DOCUMENTS

| | | | | |
|---|---|---|---|---|
| 2011/0081634 | A1* | 4/2011 | Kurata | G01C 21/20 434/236 |
| 2013/0321157 | A1* | 12/2013 | Takamura | G06Q 50/01 340/573.1 |
| 2019/0050688 | A1* | 2/2019 | Iyer | G06K 9/6274 |
| 2019/0102659 | A1* | 4/2019 | Ellis | G06K 9/6282 |

(Continued)

*Primary Examiner* — Jungwon Chang
(74) *Attorney, Agent, or Firm* — Hanley, Flight & Zimmerman, LLC

(57) ABSTRACT

Methods, apparatus, systems, and articles of manufacture for conditional classifier chaining in a constrained machine learning environment are disclosed. An example apparatus includes a classification controller to select a first model to be utilized to classify a first feature identified from sensor data. A memory controller is to copy the first model to a memory. A machine learning processor is to apply the first model to the first feature to create a first classification output, the first classification output indicating an identified class. The classification controller is to, in response to a determination that the first classification output identifies a second model to be used for classification, instruct the memory controller to load the second model into the memory. The machine learning processor is to apply the second model to the second feature to create a second classification output.

25 Claims, 9 Drawing Sheets

(56) References Cited

U.S. PATENT DOCUMENTS

2019/0163165 A1* 5/2019 Gotou ................ G05B 13/0265
2019/0197396 A1* 6/2019 Rajkumar ................ G06N 3/08
2019/0378616 A1* 12/2019 Abrami ................ G06N 20/00

* cited by examiner

METHODS AND APPARATUS FOR CONDITIONAL CLASSIFIER CHAINING IN A CONSTRAINED MACHINE LEARNING ENVIRONMENT

FIELD OF THE DISCLOSURE

This disclosure relates generally to processing of machine learning models, and, more particularly, to methods and apparatus for conditional classifier chaining in a constrained machine learning environment.

BACKGROUND

In recent years, use of remote monitoring to track objects has increased in popularity. For example, wearable devices or other devices may include sensor(s), etc. to gather data related to objects (e.g., humans, drones, animals, robotics, products, etc.) and transmitter(s) to transmit information to a remote server (e.g., a cloud-based server) for remote monitoring of the object(s). It is desirable to have such devices operate for long durations of time (e.g., weeks, months, years) without needing to be recharged.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
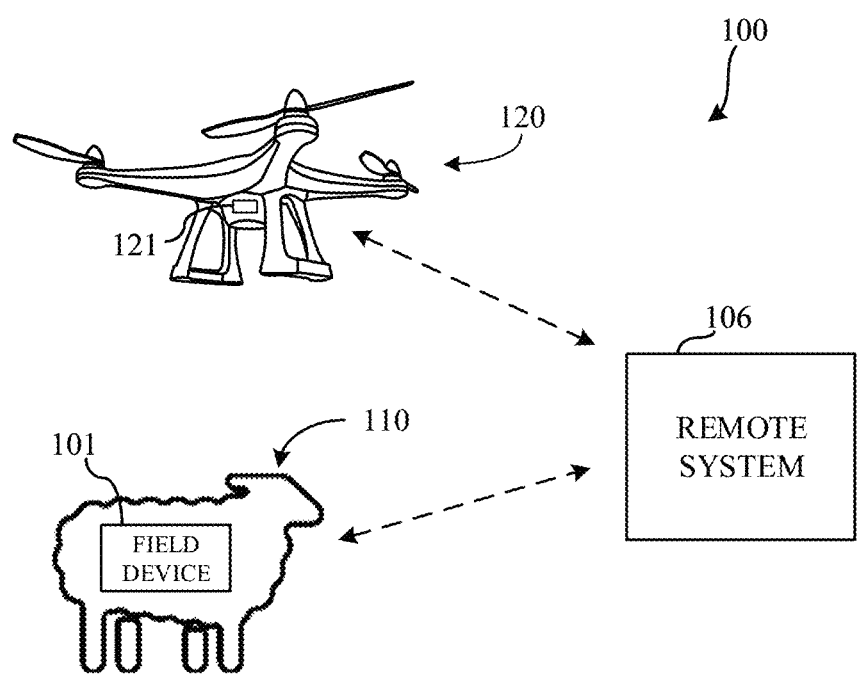
FIG. 1 illustrates an example environment in which an example field device may be used to perform conditional classifier chaining.

Monitoring systems (e.g., remote or cloud-based monitoring systems) may be implemented using one or more sensor(s) and one or more processors to monitor (e.g., track) remotely located and/or mobile objects. To track the remotely located objects, sensor(s) may be deployed in or at (e.g., attached to) the remotely located objects to output signals representative of one or more physical properties or state(s) of a monitored object. The data carried by these electromagnetic signals may be transmitted to a processor remotely located from the monitored object for analysis and/or processing. However, transmitting large amounts of data from a sensor consumes a large amount of power (e.g., relative to processing that same data). For example, transmission of the data may consume 8-10 times the power of transmitting that data to a remote site for processing. That is, transmitting the data without performing local processing and/or classification shortens the expected duration of operation of the device including the sensor before a battery recharge is required. Accordingly, as disclosed herein, some remote monitoring systems deploy one or more local processor(s) (e.g., microcontrollers, FPGAs, accelerators, pattern matching engines, etc.) to perform local computations to and/or analysis of the sensed data. Such local processor(s) are structured to perform at least some of the computations at the device, as opposed to performing all computations at a remote monitoring system.

In some examples, the remote monitoring system may be a cloud-based system (e.g., a remote monitoring system that is physically remote from the device such as in another country). However, in some examples, the remote monitoring system may be an edge-based system (e.g., a remote monitoring system that is within wireless communication range of the device such as within one kilometer). In some examples, such local processing only sends certain type(s) and/or quantity(ies) of data to the remote monitoring system for further processing and/or to alert a user. These types and/or quantities may be predetermined or determined over time (e.g., in a learning system). The amount of power required to perform such local computations is less than the power required to send raw data from the sensor to the remote monitoring system. The amount of time that a remote device that utilizes such local processing can operate before requiring a recharge is substantially longer than a device that gathers and transmits the data for remote processing.

Some example monitoring systems may monitor for particular events. For example, a monitoring system may be interested in when a particular object changes moving patterns (e.g., from standing to walking, from walking to running, from running to laying, falling from a standing position, etc.). Such systems may sense data that is not of interest. To avoid transmitting un-interesting data, some such systems include one or more pattern matching engine(s) (PME) at the local device to perform classifications based on a model. For example, a model may indicate that a pattern of acceleration data corresponds to a resultant classification of standing. That is, features (e.g., types of data) are classified as a particular type of output classification (e.g., a state or other such status such as, for example, sitting, running, standing, walking, etc.). Equipped with the model, a field device gathers data samples from a sensor (which may be onboard the field device and/or may be external to the field device) to calculate a feature (e.g., an acceleration, a temperature, an orientation, etc.) of an object, and the PME may compare the calculated feature to the model to determine a classification (e.g., is the object carrying the sensor sitting, running, standing, walking, etc.). The field device can transmit an alert to the monitoring system when the classification (e.g., a movement pattern) changes, and refrain from transmitting data when the classification is unchanged (i.e., not transmitting all sensed data to the monitoring system for resultant processing). Accordingly, the field device with local pattern matching and data processing consumes less power than a device that only gathers and transmits sensor data to a monitoring system for remote processing.

Existing pattern matching engines are limited to a fixed maximum number of neurons. For instance, a pattern matching engine may be limited to one hundred and twenty-eight neurons. To perform pattern matching using more neurons than are traditionally supported by existing pattern matching engines, some existing pattern matching engines increase the number of supported neurons (e.g., using additional and/or expanded hardware that supports additional neurons). Alternatively, some existing pattern matching engines overcome this neuron limitation by enabling hardware cascading, where multiple pattern matching engines (hardware devices) are daisy chained together. Such approaches involve additional resource costs including additional power required to operate the additional and/or expanded hardware, larger hardware footprints, additional memory requirements, etc. Moreover, using additional and/or expanded hardware elements (e.g., larger pattern matching engines, daisy chained pattern matching engines, and/or any combination thereof) increases monetary costs for producing a field device.

FIG. 1 illustrates an example environment 100 in which an example field device 101 may be used to perform conditional classifier chaining. The example environment of FIG. 1 includes a remote system 106 that communicates with the field device 101. In the illustrated example of FIG. 1, the field device 101 is mounted on and/or otherwise carried by an animal 110, and is used to monitor the animal 110. However, in some examples, a field device (e.g., the field device 121) may be additionally or alternatively mounted to, affixed to, carried by, etc. any other living or non-living (e.g., robotic) entity 120. In the illustrated example of FIG. 1, the drone 120 also carries a field device. However, any other entity may additionally or alternatively be used to carry the field device. Moreover, while in the illustrated example, two field devices carried by two respective entities (e.g., the animal 110, the drone 120) are shown, any other number of field devices (e.g., 1, 2, 3, 4, . . . , N, etc.) carried by any number of entities may additionally or alternatively be used. Moreover, in some examples, multiple field devices may be carried by a single entity, and/or a single field device may be shared among multiple entities.

The example field device 101 of the illustrated example of FIG. 1 is implemented by a hardware computing platform such as, for example, an integrated circuit, printed circuit board, and/or device that includes hardware, software, and/or firmware to process and/or classify data samples from sensor(s). Instead of transmitting the raw data/samples from the sensor(s) directly to the remote system 106, which requires a large amount of power, the example field device 101 performs classifications locally, thereby limiting the amount of data that is to be transmitted to the example remote system 106. In examples disclosed herein, the example field device 101 includes a battery that supplies power for operation of the field device 101. Because performing such classifications locally consumes less power than transmitting that data (e.g., all of the data) for remote classification, the amount of time that the example field device 101 can operate before requiring a recharge of the battery is longer than had the data been transmitted to the remote system 106 for classification.

In examples disclosed herein, the field device 101 accesses sensor data (e.g., from one or more sensors internal and/or external to the field device) that corresponds to the carrier of the field device (e.g., the animal 110, the drone 120, or any other entity where there is deemed to be value from attaching a wearable and/or constrained device). The field device 101 analyzes the sensor data, and utilizes a pattern matching engine to perform pattern matching for classification purposes. In examples disclosed herein, such pattern matching is used to identify an activity being performed by the carrier (e.g., the animal 110 or drone 120), a status of the carrier (e.g., the animal 110 or the drone 120), and/or other metric concerning the carrier (e.g., the animal 110 or the drone 120) and/or the environment of the animal 110. However, any other state and/or status of the carrier 110, 120 may additionally or alternatively be identified. In the illustrated example of FIG. 1, the field device 101 is carried by the animal 110 via a harness. However, the field device 101 may be carried by or secured to the carrier 110, 120 in any other fashion.

The example animal 110 of the illustrated example of FIG. 1 represents livestock. However, any other animal may additionally or alternatively be used such as, for example, wild and/or undomesticated animals, pets, etc. Moreover, while in the illustrated example of FIG. 1, a single animal is shown, many animals may be simultaneously monitored by such a system. Likewise, any number of other carriers (e.g., other animals, other drones, etc.) may additionally or alternatively be monitored by such a system.

The example remote system 106 is implemented by a server. In some examples, the remote system 106 is located at a cloud computing facility. In other examples, the remote system 106 is located in proximity to the carrier(s) 110, 120 being monitored (e.g., at a farm where the animals 110 reside). The example remote system 106 of FIG. 1 communicates with the example field device 101 via wired or wireless communication. For example, the field device 101 may periodically (e.g., every ten minutes, every hour, etc.) and/or aperiodically (e.g., in response to a triggering event) transmit alerts, counts, classifications, and/or other information. In this manner, the remote system 106 can provide useful information to a user regarding the objects being tracked (e.g., the example animal 110, the example drone 120, etc.). In some examples, the remote system 106 is a cloud-based data tracker. In some examples, the remote system 106 is a device (e.g., a processor) and/or a virtual machine in the cloud. In some examples, the remote system 106 may be part of and/or in communication with a processor, mobile phone, tablet, and/or any other computing device. In some examples, the remote system 106 provides model(s) and/or other instructions to the example field device 101 for classification purposes. For example, the remote system 106 may provide features to be calculated for the classification tiers, feature threshold(s) for the classification(s) of the classification tiers, different models for different classification tiers, instructions corresponding to how many classification tiers to use and when to switch from one classification tier to another, when to discard data, when to transmit alerts, classifications, and/or other information to the remote system 106, etc.

Figure 2:
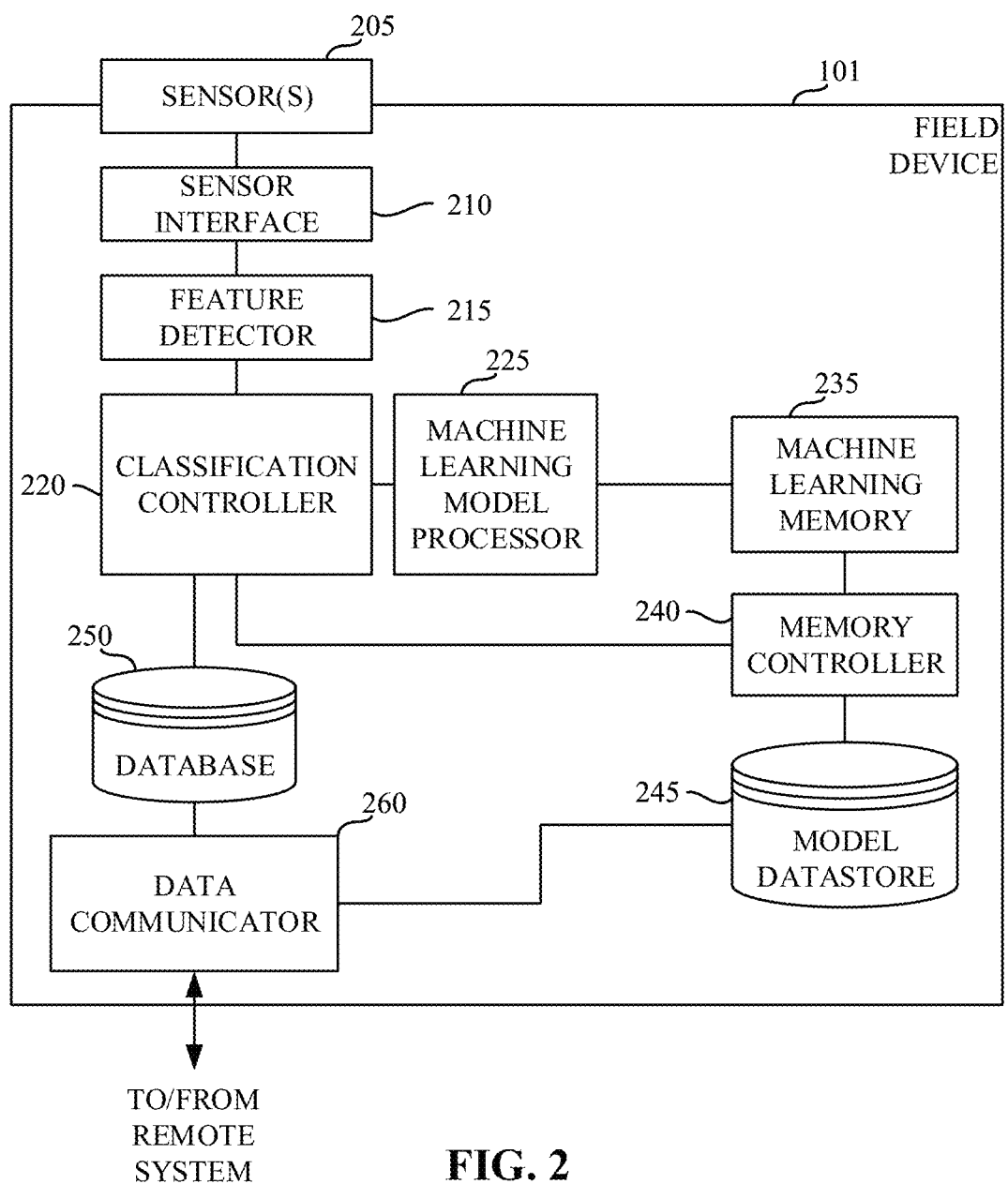
FIG. 2 is a block diagram of an example implementation of the field device of FIG. 1.

FIG. 2 is a block diagram of an example implementation of the field device 101 of FIG. 1. The example field device 101 of the illustrated example of FIG. 2 includes a sensor interface 210, a feature detector 215, a classification controller 220, a machine learning model processor 225, a machine learning memory 235, a memory controller 240, a model data store 245, a database 250, and a data communicator 260. In some examples, the example field device includes one or more sensors 205. However, in some examples the one or more sensors 205 may be external to the example field device 101.

The sensor(s) 205 of the illustrated example of FIG. 2 are implemented by one or more transducer(s) to gather (e.g., detect) physical information (e.g., acceleration, speed, temperature, light, infrared intensity, sound, position, etc.) from an object (e.g., the carrier 110, 120) and/or an environment and output one or more electrical signal(s) representative of that physical information. For example, the sensor(s) may include an accelerometer that outputs electrical signal(s) representative of acceleration of the sensor. In such an example, the electrical signal(s) may be analyzed to detect movement. While in the illustrated example of FIG. 2, the sensor(s) include an accelerometer, any other type(s) and/or number(s) of sensors may additionally or alternatively be used such as, for example, a pressure sensor, a heart rate sensor, an altimeter, a light sensor, a camera, a microphone, etc.

In some examples, one or more of the sensor(s) 205 are physically located on a circuit board of the field device 101. In some other examples, the one or more sensors 205 are not physically located on the circuit board of the field device 101 but, instead, are communicatively coupled (e.g., in a wired and/or wireless fashion) to the field device 101. In some examples, the sensor(s) 205 may include additional electronic components to facilitate the communication of the sensor data to other components such as, for example, an inter-integrated circuit communication (I2C or I$^2$C) circuit, a serial communication circuit, a wireless communication interface, etc.

The example sensor interface 210 of the illustrated example of FIG. 2 enables the field device 101 to access sensor data from the sensor(s) 205. In examples disclosed herein, the sensor interface 210 is implemented by an analog-to-digital (A2D) converter. However, the sensor interface 210 may be implemented by any other device for interfacing with the sensor(s) 205. For example, the example sensor interface 210 may be implemented by an I2C circuit, a serial port, a parallel port, a universal serial bus (USB) port, etc.

The example feature detector 215 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In examples disclosed herein, the feature detector 215 detects features such as, for example, particular sensor values (e.g., maximum sensor values, minimum sensor values, etc.), amounts of time between peaks of sensor values, etc. However, any other statistic that may additionally or alternatively be used for classifying sensor data may additionally or alternatively be used.

The example classification controller 220 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. To generate a classification, the example classification controller 220 evaluates a classifier flag to determine which classifier model is to be used. In some examples, the classifier flag is initialized by the example classification controller 220 to perform a first level of classification, which may then trigger a second and/or subsequent level of classification. The classification controller 220 instructs the example memory controller 240 to load a selected model into the machine learning memory 235. As described in connection with FIGS. 3 and/or 8 below, in some examples, the example classification controller 220 instructs a multiplexer to make a particular model available to the machine learning model processor 225.

To enable classification of input data, the example classification controller 220 selects a set of features corresponding to those features used by the model. In examples disclosed herein, the set of features is defined by the model and may include features such as, for example, particular sensor values (e.g., maximum sensor values, minimum sensor values, etc.), amounts of time between peaks of sensor values, particular types of sensor data (e.g., accelerometer data, gyroscope data, image sensor data, temperature sensor data, etc.) etc. In some examples, particular features (e.g., maximum and minimum sensor values, etc.) may be more suited to particular types of classifications. For example, gyroscope and/or accelerometer data may be more useful for indicating whether an animal is laying down or standing than, for example, temperature data. In some examples, the classification controller 220 normalizes data representative of the features.

The example classification controller 220 provides the normalized features to the example machine learning model processor 225, which applies the selected model (e.g., the model stored in the machine learning memory 235 by the example memory controller 240) to use the features as input(s) to generate a classification output. In some examples, the classification controller 220 determines that the application of the first model to generate the first output is complete by awaiting an interrupt from the machine learning model processor 225. However, any other approach to determining when application of a model is complete may additionally or alternatively be used such as, for example, polling the machine learning model processor 225 to determine if an output is ready. The classification controller 220 then stores the classification information and/or any other metadata in connection with the classification in the example database 250. In some examples, the classification controller implements means for selecting a first model to be utilized to classify features identified from feature data. In some examples, the selecting means is implemented by software, hardware, firmware, and/or a combination thereof.

The example machine learning model processor 225 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. In the illustrated example of FIG. 2, the logic circuit used to implement the machine learning model processor 225 is a pattern matching engine (PME) implemented as a component of a system-on-a-chip (SoC). Such processors can support a maximum number of neurons and/or maximum number of bytes per neuron. While these numbers are likely to increase in the future due to improvements in hardware, for clarity, at present, the machine learning model processors support a maximum number of neurons of one hundred and twenty-eight, and maximum number of bytes per neuron of one hundred and twenty-eight. However, it may be desirable to employ a pattern matching engine having more and/or larger size neurons. When the PME is implemented as a component of a SoC, hardware-based cascading (e.g., using multiple hardware PMEs in a cascaded fashion) is not a feasible solution to expanding the number of neurons.

In examples disclosed herein, the machine learning model processor 225 applies a model (e.g., a model stored in the machine learning memory 235) to features identified by the feature detector 215 to create an output that may be provided to the classification controller 220. In some examples, the machine learning model processor 225 provides a signal (e.g., an interrupt) to the classification controller 220 indicating that the output is ready. In some examples, the output identifies a subsequent model that is to be used for classification. For example, a first classification model may indicate an activity currently performed by an animal (e.g., walking, laying down, standing, etc.), and a second classification model may be used to determine a lameness status of the animal only when the animal is walking. As noted above, because the lameness of the animal may only be detected when the animal is walking with an unusual gait, processing of the status of the animal is only useful if the animal is walking (e.g., with an unusual gait or otherwise). In some examples, the machine learning model processor 225 implements means for applying a model to input features to create a classification output. In some examples, the applying means is implemented by hardware, firmware, software, or a combination thereof.

The example machine learning memory 235 of the illustrated example of FIG. 2 is implemented by any memory, storage device and/or storage disc for storing data such as, for example, flash memory, magnetic media, optical media, solid state memory, hard drive(s), thumb drive(s), etc. In some examples, the machine learning memory 235 is implemented as a register of the machine learning model processor 225. Furthermore, the data stored in the example machine learning memory 235 may be in any data format such as, for example, binary data, comma delimited data, tab delimited data, structured query language (SQL) structures, a vector space format, etc. While, in the illustrated example, the machine learning memory 235 is illustrated as a single device, the example machine learning memory 235 and/or any other data storage devices described herein may be implemented by any number and/or type(s) of memories. In the illustrated example of FIG. 2, the example machine learning memory 235 stores one or more models for use by the machine learning model processor 225. In examples disclosed herein, the one or more models are loaded into the machine learning memory 235 from the model datastore 245 by the memory controller 240.

The example memory controller 240 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example memory controller 240 loads a first model into the machine learning memory 235 that is to be used by the example machine learning model processor 225. In examples disclosed herein, the model is copied into the machine learning memory 235 from the model datastore 245. In some examples, copying of the first model into the machine learning memory 235 may be omitted if, for example, the first model is already loaded into the machine learning memory 235. In some examples, the memory controller implements means for copying a model to a location accessible by the machine learning model processor 225. In some examples, the copying means is implemented by hardware, firmware, software, or a combination thereof.

The example model data store 245 of the illustrated example of FIG. 2 is implemented by any memory, storage device and/or storage disc for storing data such as, for example, flash memory, magnetic media, optical media, etc. Furthermore, the data stored in the model data store 245 may be in any data format such as, for example, binary data, comma delimited data, tab delimited data, structured query language (SQL) structures, etc. While in the illustrated example the model data store 245 is illustrated as a single device, the model data store 245 and/or any other data storage devices described herein may be implemented by any number and/or type(s) of memories. In the illustrated example of FIG. 2, the example model data store 245 stores pattern matching models used by the machine learning model processor 225. In examples disclosed herein, the model(s) stored in the example model data store 245 may be updated from time to time to enable more efficient and/or more accurate pattern matching to be performed by the machine learning model processor 225. In some examples, the model(s) stored in the example model data store 245 may be updated by the data communicator 260 that receives, for example, a model from the remote system 106. Receiving the model from the remote system 106 enables the model to be trained based on information from other field devices.

The example database 250 of the illustrated example of FIG. 2 is implemented by any memory, storage device and/or storage disc for storing data such as, for example, flash memory, magnetic media, optical media, solid state memory, hard drive(s), thumb drive(s), etc. Furthermore, the data stored in the example database 250 may be in any data format such as, for example, binary data, comma delimited data, tab delimited data, structured query language (SQL) structures, etc. While in the illustrated example the example database 250 is illustrated as a single device, the example database 250 and/or any other data storage devices described herein may be implemented by any number and/or type(s) of memories. In the illustrated example of FIG. 2, the example database 250 stores classification data identified by the classification controller 220 (e.g., an output of the classification model). In some examples, metadata may additionally be stored in association with the classification information such as, for example, a timestamp, a location (e.g., based on global positioning system data collected by the sensor interface 210), etc. In some examples, sensor data and/or features derived therefrom that were used to generate the classification data may additionally be stored. Storing the sensor data and/or features derived therefrom enables such data to be transmitted to the remote system 106 for creation of updated models, should it be necessary to do so.

The example data communicator 260 of the illustrated example of FIG. 2 is implemented by a wireless transceiver that communicates with the remote system. In some examples, the data communicator 260 is, instead, implemented by a logic circuit such as, for example, a hardware processor that interfaces with wireless communication circuitry. However, any other type of circuitry may additionally or alternatively be used such as, for example, one or more analog or digital circuit(s), logic circuits, programmable processor(s), ASIC(s), PLD(s), FPLD(s), DSP(s), etc. In examples disclosed herein, the example data communicator 260 reports classification data stored in the database 250 to the remote system 106. That is, classification data is aggregated in the database 250 before being transmitted to the remote system 106. However, in some examples, the classification data may be immediately transmitted to the remote system when it becomes available. In some examples, the data communicator 260 receives information from the remote system 106 including, for example, instructions to trigger a classification (e.g., a request for classification data), updated model(s), etc. In some examples, the data communicator stores the updated model in the example model datastore 245 for later use by the machine learning model processor 225. In some examples, the data communicator implements means for communicating data to a remote system. In some examples, the communicating means is implemented by hardware, firmware, software, or a combination thereof.

Figure 3:
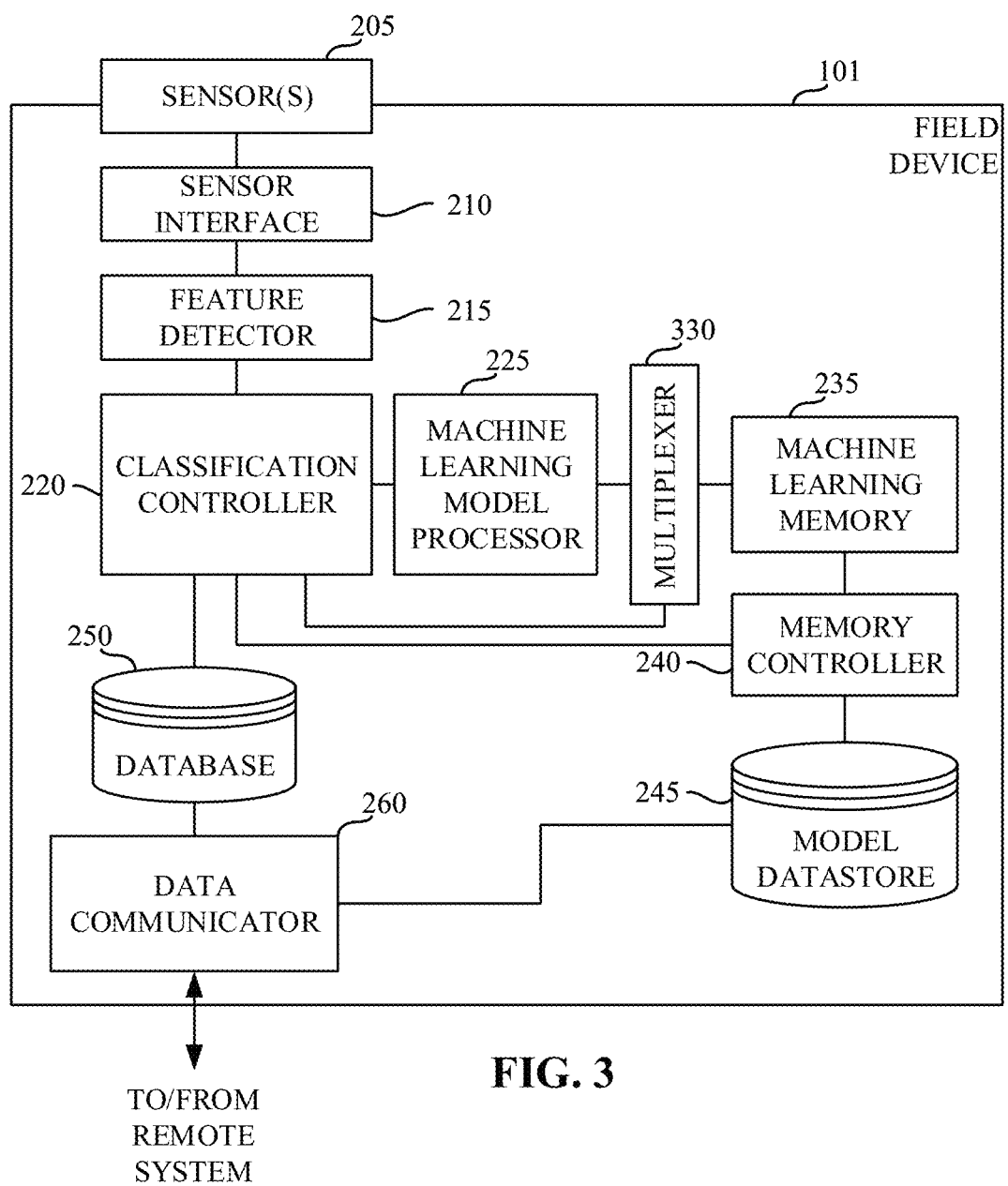
FIG. 3 is a block diagram of an example alternative implementation of the field device of FIG. 1.

FIG. 3 is a block diagram of an example alternative implementation of the field device of FIG. 2. The field device of FIG. 3 is similar to the field device of FIG. 2, but additionally includes a multiplexer 330. The example multiplexer 330 of FIG. 3 is implemented is implemented by a logic circuit such as, for example, a hardware multiplexer. However, any other type of circuitry may additionally or alternatively be used such as, for example, one or more analog or digital circuit(s), logic circuits, programmable processor(s), ASIC(s), PLD(s), FPLD(s), DSP(s), etc. The example multiplexer 330 of FIG. 3 is positioned intermediate the machine learning model processor 225 and the example machine learning memory 235. The example multiplexer 330 provides the machine learning model processor 225 with access to a selected model stored in the machine learning memory 235, based on an instruction received from the memory controller 240 and/or the classification controller 220. In some examples, the multiplexer 330 implements means for multiplexing a selected one of a first model or a second model. In some examples, the multiplexing means is implemented by hardware, firmware, software, or a combination thereof.

Figure 4:
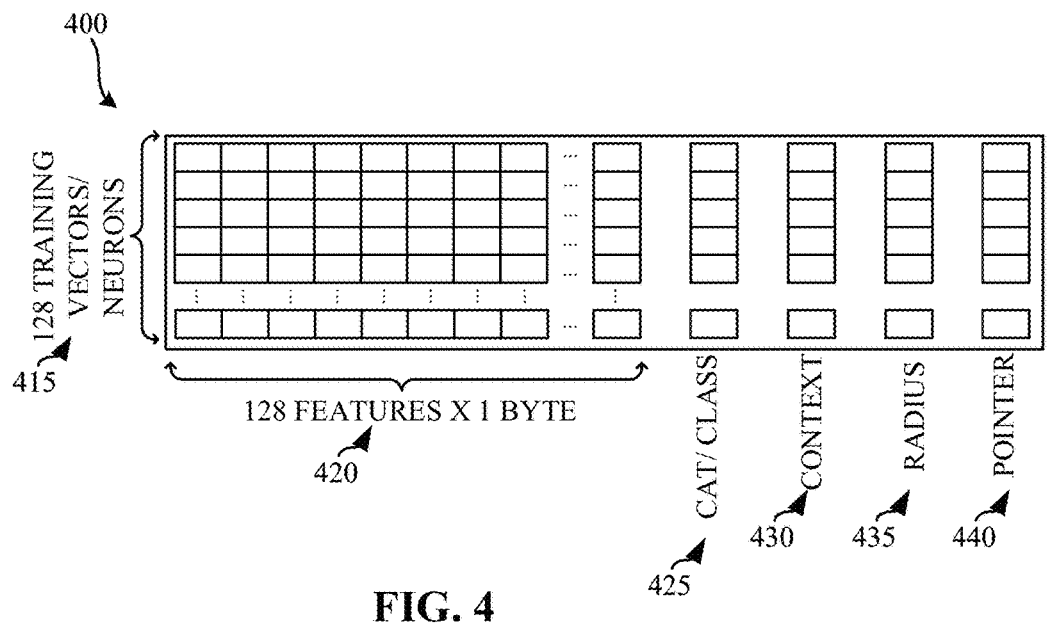
FIG. 4 is an example representation of a model used by the example field device.

FIG. 4 is an example representation of a model used by the example field device of FIGS. 1, 2, and/or 3. In the illustrated example of FIG. 4, a model 400 includes training vectors/neurons 415. The training vectors/neurons have features 420. Each training vector of this example corresponds to a respective output category 425, a context field 430, a radius 435, and a pointer 440. In the illustrated example of FIG. 4, there are one hundred and twenty-eight vectors/neurons in the model. However, as noted above, in some examples, any other number of neurons may additionally or alternatively be used. Moreover, in the illustrated example of FIG. 4, a single model is shown. However, in examples disclosed herein, multiple models may be used (e.g., may be chained together) to facilitate the use of a larger number of vectors/neurons. In some examples, such multiple models are structured as an array.

The example features 420 correspond to sensor output by the sensor and input to the machine learning model to generate a particular classification output (represented by the output category 425). In the illustrated example of FIG. 4, each vector corresponds to a respective category/classification. However, in some examples, the category/classification may indicate that further classification is possible and/or needed.

The example radius field 435 represents a threshold distance from the input feature vectors to the features of the corresponding training vector that must be satisfied in order to result in a classification. In some examples, the threshold distance is a maximum distance. However, any other type of radius and/or threshold field may additionally or alternatively be used.

The example pointer field 440 identifies a subsequent model that is to be used for further classification.

Figure 5:
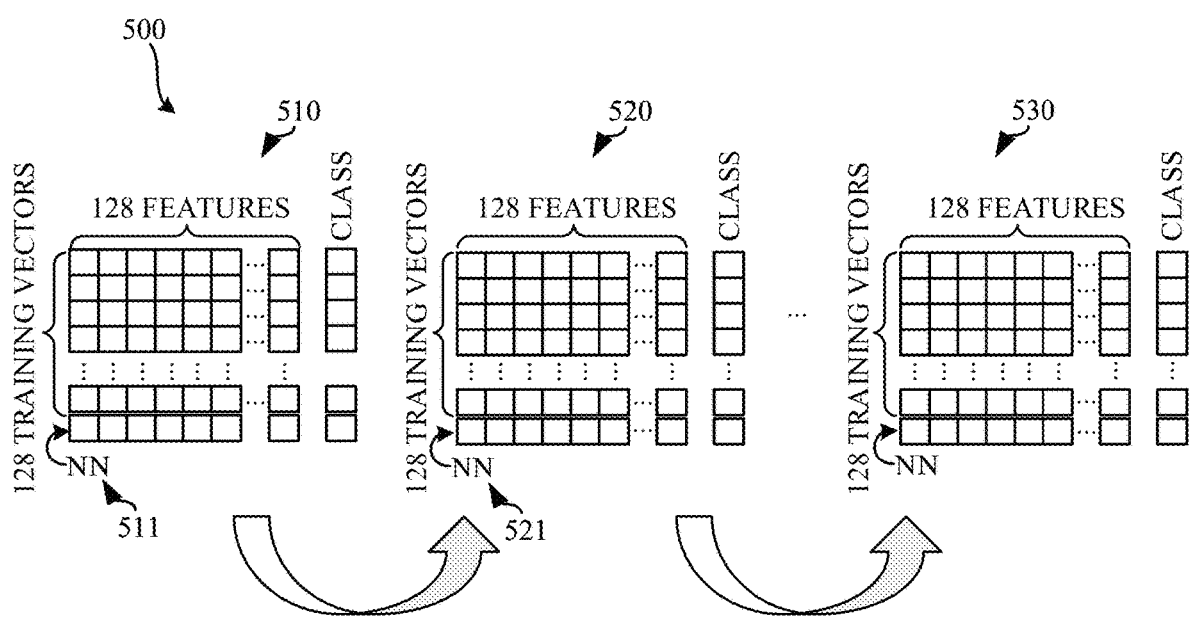
FIG. 5 is a diagram representing an example approach to chaining of models used by the example field device.

FIG. 5 is a diagram 500 representing chaining of models used by the example field device of FIGS. 1, 2, and/or 3. In the illustrated example of FIG. 5, a first model 510 is processed by the field device 101, resulting in an indication that a subsequent classification is to be performed. In the example of FIG. 5, the indication of a subsequent model is identified based on a neighbor 511 (e.g., a nearest neighbor corresponding to, for example, the vector having the best fit to the identified features) resulting from the processing of the model and the input features. A second model 520 (e.g., a model identified by the neighbor (e.g., the nearest neighbor)) is then processed by the field device 101, resulting in a further indication that a subsequent classification is to be performed. In the illustrated example of FIG. 5, the processing of the second model 520 identifies a further neighbor 521 (e.g., another nearest neighbor), resulting in a third model 530 being used to classify the input features. In the illustrated example of FIG. 5, the processing of the third model 530 does not result in a further model (e.g., a fourth model) being used for classification. In some examples, this may be because: (a) the third model has reached a sufficient level of accuracy in its classification, (b) because all models have been processed, and/or (c) because the nearest neighbor of the third model does not indicate an accuracy that is greater than the prior nearest neighbor (e.g., the nearest neighbor of the second model 520). Although the example uses three models, any number of models may be chained (e.g., 2, 4, or more models).

In the illustrated example of FIG. 5, the model used for the subsequent classifications is based on an output of the classification (e.g., based on the pointer field 440 of the prior nearest neighbor). However, in some examples, such output may be omitted and the subsequent classifications may, instead, sequentially process other models (e.g., until all available models have been processed, until a classification with a threshold accuracy has been found, until a threshold number of iterations have been performed, etc.) In the illustrated example of FIG. 5, the separate models (e.g., the first model 510, the second model 520, the third model 530, etc.) are each processed by the same hardware device (e.g., the machine learning model processor 225).

While an example manner of implementing the example field device 101 of FIG. 1 is illustrated in FIGS. 2 and/or 3, one or more of the elements, processes and/or devices illustrated in FIGS. 2 and/or 3 may be combined, divided, re-arranged, omitted, eliminated and/or implemented in any other way. Further, the example sensor interface 210, the example feature detector 215, the example classification controller 220, the example machine learning model processor 225, the example machine learning memory 235, the example memory controller 240, the example data communicator 260, the example multiplexer 330, and/or, more generally, the example field device 101 of FIGS. 2 and/or 3 may be implemented by hardware, software, firmware and/or any combination of hardware, software and/or firmware. Thus, for example, any of the example sensor interface 210, the example feature detector 215, the example classification controller 220, the example machine learning model processor 225, the example machine learning memory 235, the example memory controller 240, the example data communicator 260, the example multiplexer 330, and/or, more generally, the example field device 101 of FIGS. 2 and/or 3 could be implemented by one or more analog or digital circuit(s), logic circuits, programmable processor(s), programmable controller(s), graphics processing unit(s) (GPU (s)), digital signal processor(s) (DSP(s)), application specific integrated circuit(s) (ASIC(s)), programmable logic device (s) (PLD(s)) and/or field programmable logic device(s) (FPLD(s)). When reading any of the apparatus or system claims of this patent to cover a purely software and/or firmware implementation, at least one of the example sensor interface 210, the example feature detector 215, the example classification controller 220, the example machine learning model processor 225, the example machine learning memory 235, the example memory controller 240, the example data communicator 260, the example multiplexer 330, and/or, more generally, the example field device 101 of FIGS. 2 and/or 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example field device 101 of FIGS. 2 and/or 3 may include one or more elements, processes and/or devices in addition to, or instead of, those illustrated in FIGS. 2 and/or 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
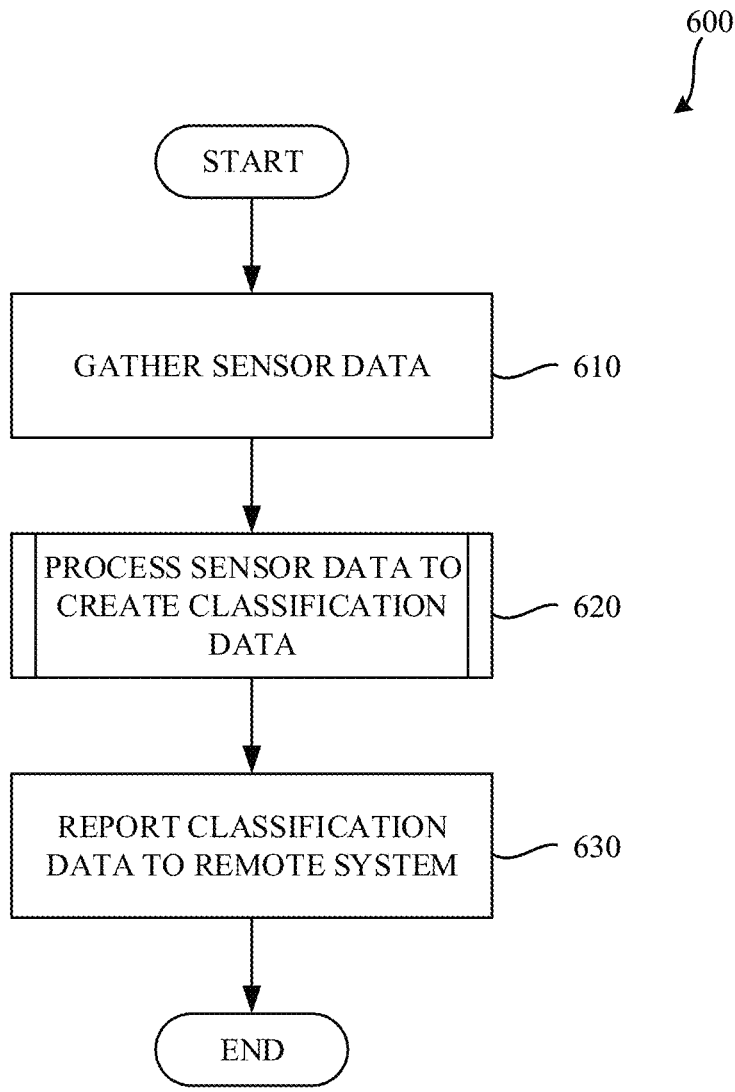
FIG. 6 is a flowchart representative of example machine readable instructions which may be executed to implement the example field device of FIGS. 1, 2, and/or 3 to report classification data.
Figure 7:
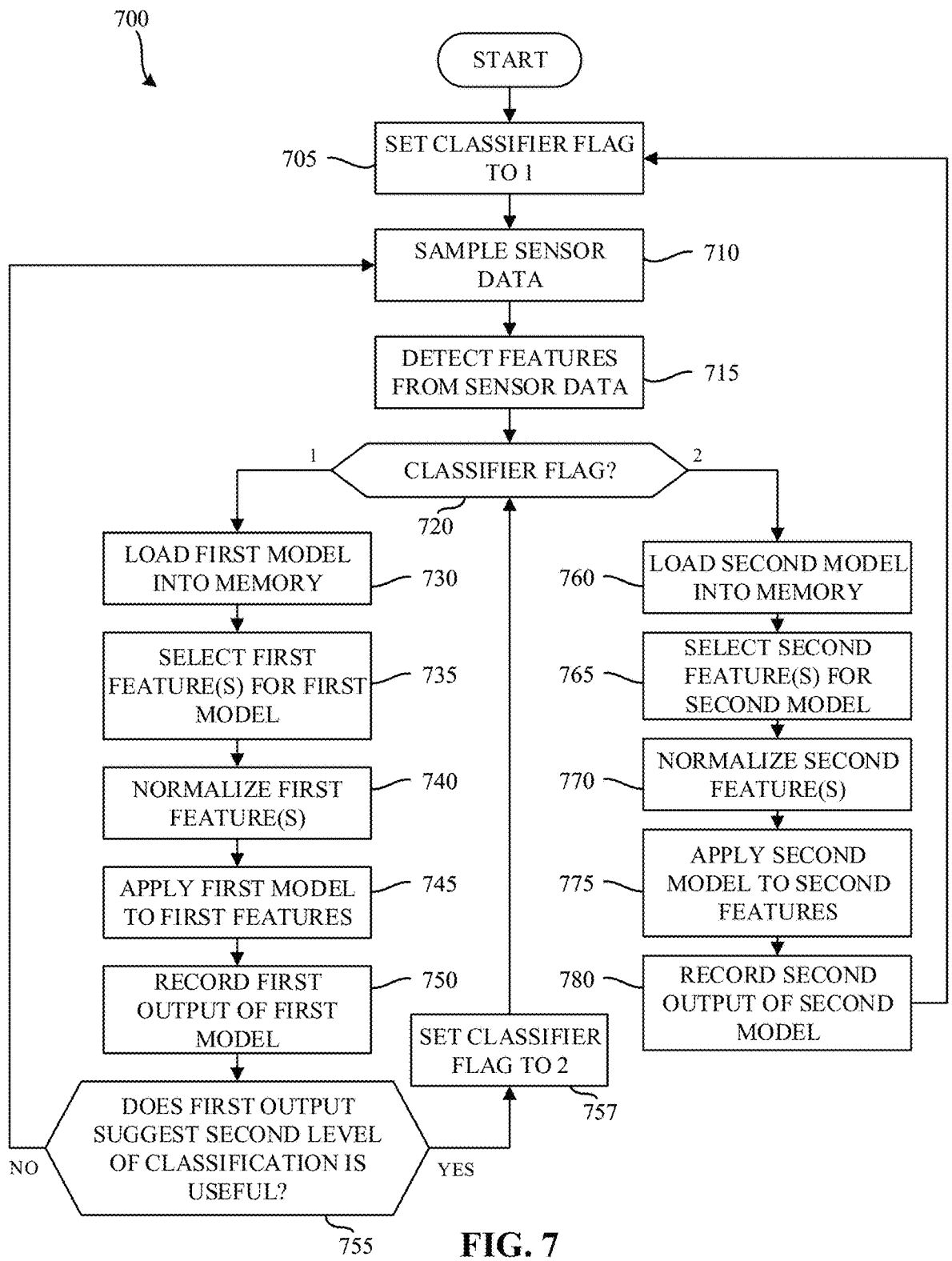
FIG. 7 is a flowchart representative of example machine readable instructions which may be executed to implement the example field device of FIGS. 1 and/or 2 to perform classification of sensor data using conditional classifier chaining.
Figure 8:
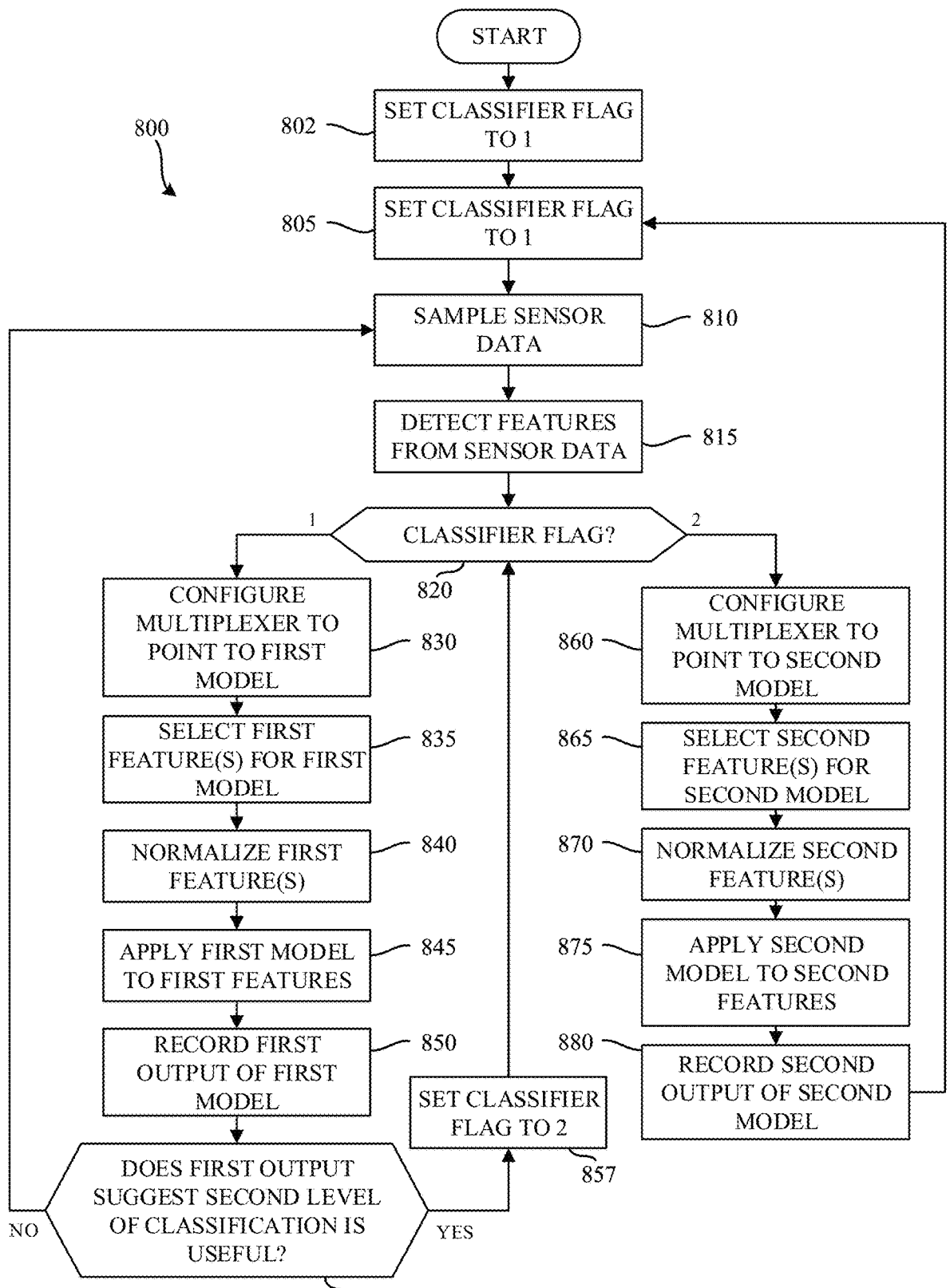
FIG. 8 is a flowchart representative of example machine readable instructions which may be executed to implement the example field device of FIGS. 1 and/or 3 to perform classification of sensor data using conditional classifier chaining in connection with the multiplexer of FIG. 3.

Flowcharts representative of example hardware logic, machine readable instructions, hardware implemented state machines, and/or any combination thereof for implementing the example field device 101 of FIGS. 1, 2, and/or 3 are shown in FIGS. 6, 7, 8, and/or 9. The machine readable instructions may be an executable program or portion of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart(s) illustrated in FIGS. 6, 7, 8, and/or 9, many other methods of implementing the example field device 101 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6, 7, 8, and/or 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 6 is a flowchart representative of machine readable instructions which may be executed to implement the example field device of FIGS. 1, 2, and/or 3 to report classification data. The example process 600 the illustrated example of FIG. 6 begins when the example sensor interface 210 collects sensor data from the sensors 205. (Block 610). The example field device 101 processes the collected sensor data to create classification data. (Block 620). Example approaches for processing the collected sensor data are described in further detail below in connection with FIGS. 7, 8, and/or 9. In some examples, the resulting classification data is stored in the example database 250 of the example field device 101. The example data communicator 260 then reports the classification data to the remote system 106. (Block 630). The example process 600 then terminates. However, in some examples, the example process 600 of the illustrated example of FIG. 6 may be repeated periodically and/or aperiodically to cause the collection of sensor data and reporting of classification information to the remote system 106.

The reporting of the classification data to the remote system 106 enables the remote system to, for example, provide alerts to a user and/or operator. For example, in a livestock monitoring environment, classification information may represent an activity that a particular animal is performing (e.g., walking, running, trotting, laying down, etc.). In some examples, the classification information may represent other properties of the animal such as, for example, whether the animal is lame and/or otherwise impaired. Because lameness is best detected when the animal is walking (e.g., is walking with an irregular gait), such further classification information is best suited for cases where an initial classification indicates that the animal is walking. Thus, in some examples, some subsequent classifications may only be performed when a prior classification suggests that the subsequent classification is possible.

FIG. 7 is a flowchart representative of machine readable instructions which may be executed to implement the example field device of FIGS. 1 and/or 2 to perform classification of sensor data using conditional classifier chaining. The example process 700 of the illustrated example of FIG. 7 begins when the example classification controller 220 sets a classifier flag to a value of one. (Block 705). Setting the example classifier flag to one initializes the example field device 101 to perform a first type of classification (e.g., a classification to identify an activity being performed). The example sensor interface 210 samples the data from the one or more sensors 205. (Block 710). The example feature detector 215 detects features from the sensor data. (Block 715). In examples disclosed herein, the feature detector 215 detects features such as, for example, maximum sensor values, minimum sensor values, amounts of time between peaks of sensor values, etc.

The example classification controller 220 evaluates the classifier flag to determine which classifier model is to be used. (Block 720). Because, in the first iteration, the classification controller 220 had initialized the classifier flag to one, the classification controller 220 will first identify the classifier flag as having the value of one.

The example memory controller 240 loads a first model into the machine learning memory 235 that is to be used by the example machine learning model processor 225. (Block 730). In the illustrated example of FIG. 7, the model data is copied into a memory location used by the machine learning model processor 225. In some examples, copying of the first model into the machine learning memory 235 may be omitted if, for example, the first model is already loaded into the machine learning memory 235.

The example classification controller 220 selects a first set of features for use in association with the first model. (Block 735). In some examples, particular features may be more suited to particular types of classifications. For example, gyroscope and/or accelerometer data indicating whether an animal is laying down or standing may be more useful for detecting an activity of the animal than, for example, temperature data. In the illustrated example of FIG. 7, the example classification controller 220 normalizes the features. (Block 740).

The example classification controller 220 provides the normalized features to the example machine learning model processor 225, which applies the first model (e.g., the model stored in the machine learning memory 235 by the example memory controller 240 in connection with block 730) to generate a first output. (Block 745). In some examples, the classification controller 220 determines that the application of the first model to generate the first output is complete by awaiting an interrupt from the machine learning model processor 225. However, any other approach to determining when application of a model is complete may additionally or alternatively be used such as, for example, polling the machine learning model processor 225 to determine if an output is ready.

In examples disclosed herein, the first output represents a first classification of the input data, an indication that further classification may be needed, and/or any combination thereof. For example, the first classification may indicate an activity being performed by an animal. In such an example, if an animal is walking, further classifications may be performed to determine whether the animal is lame (e.g., injured). The example classification controller records the first output of the first model in the example database 250. (Block 750). In some examples, the first output is stored with other associated information such as, for example, a timestamp, a location (e.g., based on global positioning system data collected by the sensor interface 210), etc. The first output (and/or any other associated information) may then be transmitted (e.g., individually and/or in the aggregate) to the remote system 106 by the data communicator 260. In some examples, storing of the first output is omitted and the first output is, instead, immediately transmitted to the remote system by the data communicator 260.

The example classification controller 220 then determines whether the first output suggests that a second level of classification is useful (e.g., whether a further classification is necessary). (Block 755). If no further classification is needed (e.g., block 755 returns a result of NO), the example process of blocks 710 through 755 is repeated until the classification controller 220 determines that a subsequent level of classification is useful (e.g., until block 755 returns a result of YES).

Upon the classification controller 220 determining that the subsequent level of classification is useful (e.g., when block 755 returns a result of YES), the example classification controller 220 updates the classifier flag to a value of two (indicating that a second classification is to be performed). (Block 757). Control then returns to block 720, where the example classification controller 220 determines that the classifier flag is set to a value of two. (Block 720).

The example memory controller 240 loads a second model into the machine learning memory 235 that is to be used by the example machine learning model processor 225. (Block 760). In the illustrated example of FIG. 7, the model data is copied into a memory location used by the machine learning model processor 225. The example classification controller 220 then selects a second set of features for use in association with the second model. (Block 765). Because, for example, particular features may be more suited to particular types of classifications, the second set of features may be different from the first set of features (e.g., the first set of features selected in association with block 735). However, in some examples, the second set of features and the first set of features may represent the same features. In the illustrated example of FIG. 7, the example classification controller 220 normalizes the selected second features. (Block 770).

The example classification controller 220 provides the normalized features to the example machine learning model processor 225, which applies the second model (e.g., the model stored in the machine learning memory 235 by the example memory controller 240 in connection with block 760) to generate a second output. (Block 775). In examples disclosed herein, the second output represents a second classification of the input data that is different from the first classification. For example, whereas the first classification indicated an activity currently performed by an animal (e.g., walking, laying down, standing, etc.), the second classification may indicate a lameness status of the animal as lame or not lame (e.g., healthy). As noted above, because the lameness of the animal may only be detected when the animal is walking with an unusual gait, processing of the status of the animal is only useful if the animal is walking (e.g., with an unusual gait or otherwise).

In some examples, the second output includes an indication that further classification may be needed (e.g., an indication that a third or subsequent model is to be used, an indication that further classifications are possible, etc.). For example, if an animal is detected to be lame (e.g., via the second classification), a further classification may be performed to determine the severity of the lameness. Such a severity indication may be useful for triage purposes (e.g., to determine which animal(s) are to be treated first). The example classification controller records the first output of the second model in the example database 250. (Block 780). In some examples, the second output is stored with other associated information such as, for example, a timestamp, a location (e.g., based on global positioning system data collected by the sensor interface 210), etc. In some examples, the second output is stored in association with the first output (e.g., the first output stored in connection with block 750). The second output (and/or any other associated information, potentially including the first output) may then be transmitted (e.g., individually and/or in the aggregate) to the remote system 106 by the data communicator 260. In some examples, the storing of the first output is omitted and the first output is, instead, immediately transmitted to the remote system by the data communicator 260. Control then proceeds to block 705, where the classifier flag is returned to a value of one. The example process 700 of FIG. 7 is then continually repeated (e.g., periodically and/or a-periodically) to process sensor data and report classification data based thereon.

While in the illustrated example of FIG. 7, the example classification controller 220 selects between two models, the example classification controller 220 may select between any number of models. In some examples, the selection may be performed based on an output of a prior model. In some other examples, subsequent models may be sequentially selected without regard to the results of the processing of a prior model. Moreover, upon completion of the application of the second model, in some examples, the classifier may determine a subsequent model to be used (e.g., a third model, a fourth model, etc.) instead of returning to the first model.

In the illustrated example of FIG. 7, when the example classification controller 220 determines which model is to be used, the model is copied into the machine learning memory 235. In some examples, such copy operations may be time-consuming and cause processing delays. In contrast to the example of FIG. 7, FIG. 8 is a flowchart representative of machine readable instructions which may be executed to implement the example field device of FIGS. 1 and/or 3 to perform classification of sensor data using conditional classifier chaining in connection with the multiplexer 330 of FIG. 3. That is, in the illustrated example of FIG. 8, a hardware multiplexer is used to quickly and efficiently switch between models to be used by the example machine learning model processor 225.

The example process 800 of the illustrated example of FIG. 8 begins when the example memory controller 240 loads machine learning models into the machine learning memory 235. (Block 802). In the illustrated example of FIG. 8, multiple machine learning models are loaded into the machine learning memory 235 such that the multiplexer 330 can provide switchable access to a selected one of the models. The example classification controller 220 sets a classifier flag to a value of one. (Block 805). Setting the example classifier flag to one initializes the example field device 101 to perform a first type of classification (e.g., a classification to identify an activity being performed). The example sensor interface 210 samples the data from the one or more sensors 205. (Block 810). The example feature detector 215 detects features from the sensor data. (Block 815). In examples disclosed herein, the feature detector 215 detects features such as, for example, maximum sensor values, minimum sensor values, amounts of time between peaks of sensor values, etc.

The example classification controller 220 evaluates the classifier flag to determine which classifier model is to be used. (Block 820). Because, in the first iteration, the classification controller 220 had initialized the classifier flag to one, the classification controller 220 will first identify the classifier flag as having the value of one.

The example memory controller 240 configures the multiplexer 330 to enable access to the first model stored in the machine learning memory 235. (Block 830). Because copy operations (e.g., operations to move a model into the machine learning memory 235) are time-consuming, using the multiplexer 330 enables the model used by the machine learning model processor 225 to be pre-loaded into memory, along with other models (e.g., at block 802). The machine learning model processor 225 may then be quickly switched between the loaded models. While in the illustrated example of FIG. 8, the models are loaded into the machine learning memory 235, in some examples, the models may, instead, remain stored in the model data store 245 and the multiplexer 330 may enable access to the models directly in the model data store 245.

The example classification controller 220 then selects a first set of features for use in association with the first model. (Block 835). In some examples, particular features may be more suited to particular types of classifications. For example, gyroscope and/or accelerometer data indicating whether an animal is laying down or standing may be more useful for detecting an activity of the animal than, for example, temperature data. In the illustrated example of FIG. 8, the example classification controller 220 normalizes the features. (Block 840).

The example classification controller 220 provides the normalized features to the example machine learning model processor 225, which applies the first model (e.g., the model provided via the multiplexer 330 in connection with block 830) to generate a first output. (Block 845). In examples disclosed herein, the first output represents a first classification of the input data, an indication that further classification may be needed, and/or any combination thereof. For example, the first classification may indicate an activity being performed by an animal. In such an example, if an animal is walking, further classifications may be performed to determine whether the animal is lame (e.g., injured). The example classification controller records the first output of the first model in the example database 250. (Block 850). In some examples, the first output is stored with other associated information such as, for example, a timestamp, a location (e.g., based on global positioning system data collected by the sensor interface 210), etc. The first output (and/or any other associated information) may then be transmitted (e.g., individually and/or in the aggregate) to the remote system 106 by the data communicator 260. In some examples, storing of the first output is omitted and the first output is, instead, immediately transmitted to the remote system by the data communicator 260.

The example classification controller 220 then determines whether the first output suggests that a second level of classification is useful (e.g., whether a further classification is necessary). (Block 855). If no further classification is needed (e.g., block 855 returns a result of NO), the example process of blocks 810 through 855 is repeated until the classification controller 220 determines that a subsequent level of classification is useful (e.g., until block 855 returns a result of YES).

Upon the classification controller 220 determining that the subsequent level of classification is useful (e.g., when block 855 returns a result of YES), the example classification controller 220 updates the classifier flag to a value of two (indicating that a second classification is to be performed). (Block 857). Control then returns to block 820, where the example classification controller 220 determines that the classifier flag is set to a value of two. (Block 820). While in the illustrated example of FIG. 8, the example classification controller 220 selects between two models, the example classification controller 220 may select between any number of models. In some examples, the selection may be performed based on an output of a prior model. In some other examples, subsequent models may be sequentially selected without regard to the results of the processing of a prior model. Moreover, upon completion of the application of the second model, in some examples, the classifier may determine a subsequent model to be used (e.g., a third model, a fourth model, etc.) instead of returning to the first model.

The example memory controller 240 configures the multiplexer 330 to enable access to the second model stored in the machine learning memory 235. (Block 860). Again, using the multiplexer 330 enables the model used by the machine learning model processor 225 to be pre-loaded into memory, along with other models. The machine learning model processor 225 may then be quickly switched between the loaded models (e.g., to the second model). While in the illustrated example of FIG. 8, the models are loaded into the machine learning memory 235, in some examples, the models may, instead, remain stored in the model data store 245 and the multiplexer 330 may enable access to the models directly in the model data store 245.

The example classification controller 220 selects a second set of features for use in association with the second model. (Block 865). Because, for example, particular features may be more suited to particular types of classifications, the second set of features may be different from the first set of features (e.g., the first set of features selected in association with block 835). However, in some examples, the second set of features and the first set of features may represent the same features. In the illustrated example of FIG. 8, the example classification controller 220 normalizes the selected second features. (Block 870).

The example classification controller 220 provides the normalized features to the example machine learning model processor 225, which applies the second model (e.g., the model stored in the machine learning memory 235 by the example memory controller 240 in connection with block 860) to generate a second output. (Block 875). In examples disclosed herein, the second output represents a second classification of the input data that is different from the first classification. For example, whereas the first classification indicated an activity currently performed by an animal (e.g., walking, laying down, standing, etc.), the second classification may indicate a lameness status of the animal as lame or not lame (e.g., healthy). As noted above, because the lameness of the animal may only be detected when the animal is walking with an unusual gait, processing of the status of the animal is only useful if the animal is walking (e.g., with an unusual gait or otherwise).

In some examples, the second output includes an indication that further classification may be needed (e.g., an indication that a third or subsequent model is to be used, an indication that further classifications are possible, etc.). For example, if an animal is detected to be lame (e.g., via the second classification), a further classification may be performed to determine the severity of the lameness. Such a severity indication may be useful for triage purposes (e.g., to determine which animal(s) are to be treated first). The example classification controller records the first output of the second model in the example database 250. (Block 880). In some examples, the second output is stored with other associated information such as, for example, a timestamp, a location (e.g., based on global positioning system data collected by the sensor interface 210), etc. In some examples, the second output is stored in association with the first output (e.g., the first output stored in connection with block 850). The second output (and/or any other associated information, potentially including the first output) may then be transmitted (e.g., individually and/or in the aggregate) to the remote system 106 by the data communicator 260. In some examples, the storing of the first output is omitted and the first output is, instead, immediately transmitted to the remote system by the data communicator 260. Control then proceeds to block 805, where the classifier flag is returned to a value of one. The example process 800 of FIG. 8 is then repeated (e.g., periodically and/or a-periodically) to process sensor data and report classification data based thereon.

Figure 9:
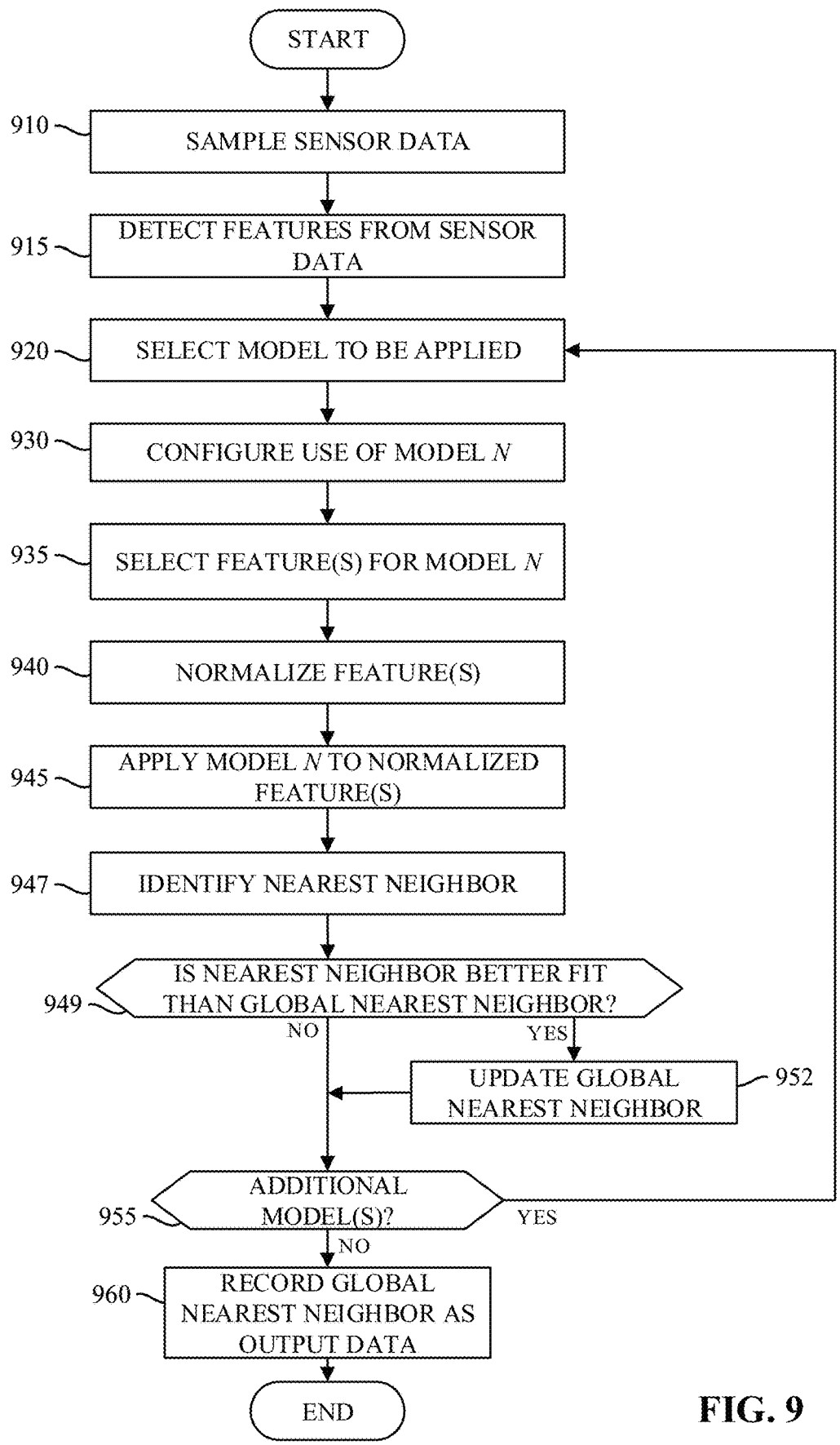
FIG. 9 is a flowchart representative of example machine readable instructions which may be executed to implement the example field device of FIGS. 1, 2, and/or 3 to perform classification of sensor data using an unconstrained number of classification models.

FIG. 9 is a flowchart representative of machine readable instructions which may be executed to implement the example field device of FIGS. 1, 2, and/or 3 to perform classification of sensor data using an unconstrained number of classification models. The example process 900 of the illustrated example of FIG. 9 begins when the example sensor interface 210 samples the data from the one or more sensors 205. (Block 910). The example feature detector 215 detect features from the sensor data. (Block 915). In examples disclosed herein, the feature detector 215 detects features such as, for example, maximum sensor values, minimum sensor values, amounts of time between peaks of sensor values, etc.

The example classification controller 220 selects a model to be applied. (Block 920). In examples disclosed herein, the model to be applied is based on prior models that have been applied. In some examples, a default model (e.g., a first model) is first selected, and a second model and/or other subsequent model may then be selected based on the result of the first model (and/or the first model may be subsequently selected on a future iteration to apply the same model again).

The example memory controller 240 configures the use of the selected model. (Block 930). In examples disclosed herein, the model may be configured for use by loading the model into the machine learning memory 235. Alternatively, in some examples, such model may be loaded into the machine learning memory 235 prior to selection of the model to be applied, and the multiplexer 330 may be configured to make the selected model (which may have already been loaded into the machine learning memory 235 and/or some other location) available to the machine learning model processor 225.

The example classification controller 220 selects a set of features for use in association with the selected model. (Block 935). As noted above, in some examples, particular features may be more suited to particular types of classifications and/or models. In some examples, the features used between one iteration and the next are different. As a result, multiple classification vectors that utilize the maximum number of features may be used in connection with each other (e.g., across multiple models), to effectively increase the number of features used for a given classification vector. The example classification controller 220 normalizes the features. (Block 940).

The example classification controller 220 provides the normalized features to the example machine learning model processor 225, which applies the selected model to generate an output. (Block 945). In examples disclosed herein, the output represents a classification of the input data and an indication of a model that is to be used for subsequent classifications (if necessary). In examples disclosed herein, the output also identifies a distance between the input feature(s) and the training vector(s) in the model. The example classification controller 220 uses the distance information to identify a nearest neighbor. (Block 947). In examples disclosed herein, the nearest neighbor is the training vector having the smallest distance to the input features. While in the illustrated example of FIG. 9, a nearest neighbor function is used to select a result of the application of the model, any other function may be used to select the result of the application of the model. For example, a radial basis function (RBF) may be used to select a result of the application of the model.

The example classification controller 220 determines whether the identified nearest neighbor is a better fit (e.g., has a smaller distance) than a global nearest neighbor. (Block 949). In examples disclosed herein, information concerning the global nearest neighbor is stored in the example database 250. If the identified nearest neighbor is a better fit than the global nearest neighbor (e.g., block 949 returns a result of YES), or if there is no existing global nearest neighbor (e.g., if this is the first iteration of the process 900), the example classification controller 220 updates the global nearest neighbor. (Block 952).

The example classification controller 220 determines whether an additional model is to be used. (Block 955). In some examples, the determination of the subsequent model to be used is based on a pointer associated with the nearest neighbor and/or the global nearest neighbor (e.g., the pointer field 440 of FIG. 4). Thus, if, for example, the pointer associated with the global nearest neighbor (and/or the most recent nearest neighbor) identifies a model that has not yet been evaluated, the example classification controller 220 may determine that an additional model (e.g., the model identified by the pointer of the global nearest neighbor) is to be evaluated.

In some other examples, instead of evaluating the pointer of the nearest neighbor, the example classification controller 220 sequentially processes additional models (e.g., model 0, model 1, model 2, etc.) until all models have been processed.

In some examples, maximum threshold number of models to be evaluated is used. For example, if the threshold were set to five models, the example classification controller 220 would compare the number of already-processed models to the threshold to determine whether a further model is to be evaluated.

In some examples, the determination of whether additional model(s) are to be evaluated is further based on whether the global nearest neighbor meets a threshold classification distance. That is, the example classification controller 220 may determine that further model(s) are to be evaluated when the radius field of the nearest neighbor (e.g., the radius field 435 of FIG. 4) is greater than a classification threshold. As a result, if evaluation of a model results in identification of a classification having a distance that is less than the threshold distance, the example classification controller 220 may determine that no further evaluation is necessary (e.g., block 955 may return a result of NO).

If an additional model is to be used (e.g., if block 955 returns a result of YES), control proceeds to block 920, where the process of blocks 920 through 955 is repeated until no additional models are to be applied (e.g., until block 955 returns a result of NO).

If no additional models are to be applied (e.g., block 955 returns a result of NO), the example classification controller 220 records the output of the model(s) in the example database 250. (Block 960). In some examples, the output is stored with other associated information such as, for example, a timestamp, a location (e.g., based on global positioning system data collected by the sensor interface 210), etc. The output data (and/or any other associated information) may then be transmitted (e.g., individually and/or in the aggregate) to the remote system 106 by the data communicator 260. In some examples, storing of the output is omitted and the output is, instead, immediately transmitted to the remote system by the data communicator 260. The example process 900 of FIG. 9 then terminates, but may be repeated (e.g., periodically and/or a-periodically) to process sensor data and report classification data based thereon.

Figure 10:
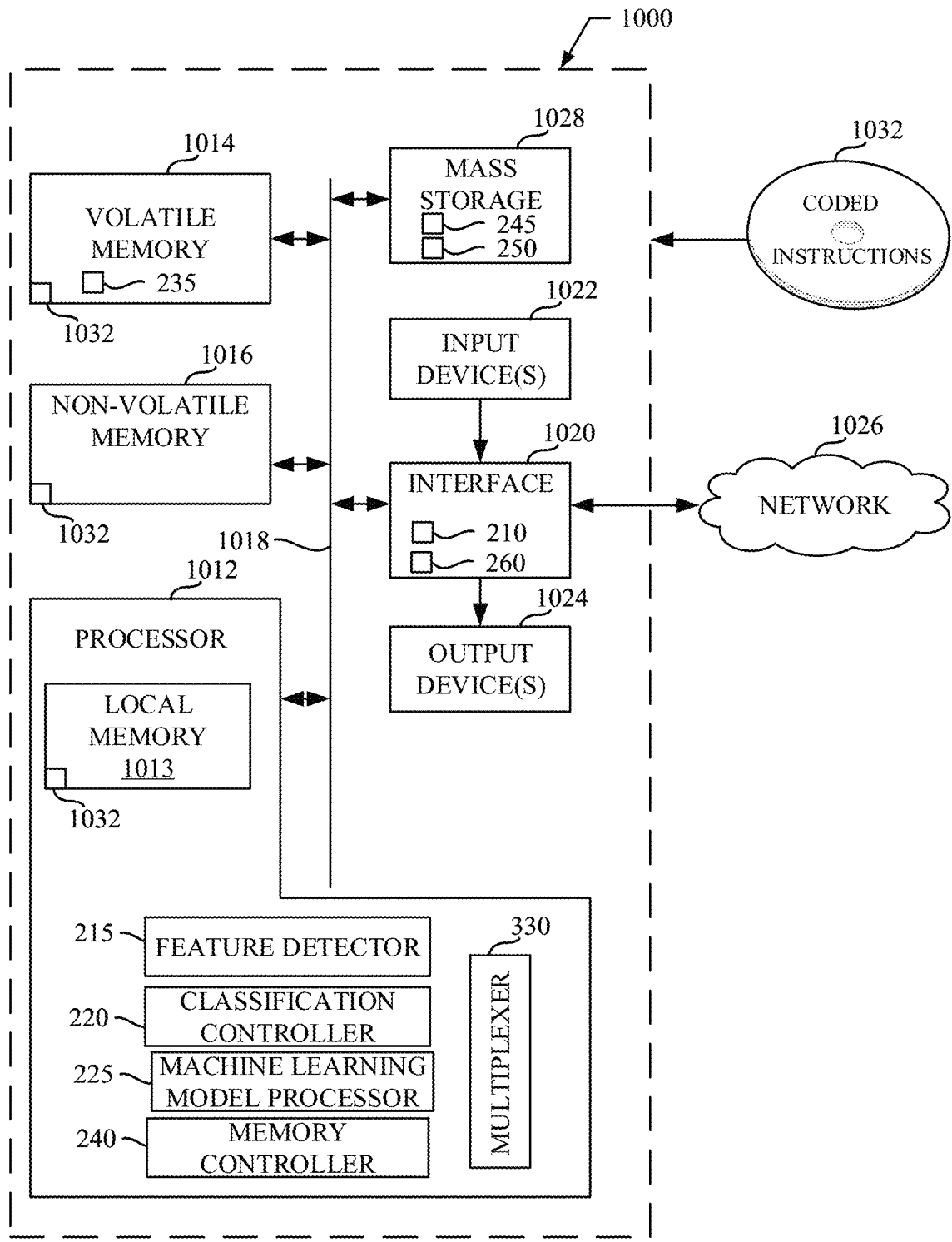
FIG. 10 is a block diagram of an example processing platform structured to execute the instructions of FIGS. 6, 7, 8, and/or 9 to implement the example field device of FIGS. 1, 2, and/or 3.

FIG. 10 is a block diagram of an example processor platform 1000 structured to execute the instructions of FIGS. 6, 7, 8, and/or 9 to implement the field device 101 of FIGS. 1, 2, and/or 3. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example feature detector 215, example classification controller 220, the example machine learning model processor 225, the example memory controller 240, and the example multiplexer 330. However, as noted in connection with the example field device 101 of FIG. 2, in some examples, the multiplexer 330 may be omitted or may be circuitry located outside the processor.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1016 may be implemented by flash memory, 3D) XPoint memory, and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint, an accelerometer, an analog to digital converter, a temperature sensor, and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-plane switching (IPS) display, a touchscreen, etc.), a tactile output device, and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc. In the illustrated example of FIG. 10, the example interface circuit implements the example sensor interface 210 and the example data communicator 260.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 5, 6, 7, and/or 9 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that enable chaining of multiple machine learning models for use in a classification system. Such chaining enables capacity expansion/extension in constrained resource environments. Such as in SoC implementations where more than a maximum number of neurons and/or more than a maximum size of neurons are needed to produce a desired classification. Moreover, such chaining enables hierarchical classification, resulting in fewer models needing to be processed to arrive at an accurate classification, as compared to prior systems, which would process all possible models/vectors before arriving at a final classification output. Larger vector spaces are also enabled as a result of the example approaches disclosed herein. Such approaches enable reduced hardware footprints to be used in classification systems, reducing power requirements, system costs, etc. For example, instead of using larger hardware that supports large amounts of neurons, and/or using multiple instances of such smaller hardware, example approaches used herein enable a same result to be achieved using smaller hardware footprints. The disclosed methods, apparatus and articles of manufacture are accordingly directed to one or more improvement(s) in the functioning of a computer.

Example 1 includes an apparatus for conditional classifier chaining, the apparatus comprising a classification controller to select a first model to be utilized to classify a first feature identified from sensor data, a memory controller to copy the first model to a memory, and a machine learning processor to apply the first model to the first feature to create a first classification output, the first classification output indicating an identified class, the classification controller to, in response to a determination that the first classification output identifies a second model to be used for classification, instruct the memory controller to load the second model into the memory, the machine learning processor to apply the second model to a second feature to create a second classification output.

Example 2 includes the apparatus of example 1, wherein the memory controller is to copy the second model to the memory, and further including a hardware multiplexer to provide access to the first model or the second model.

Example 3 includes the apparatus of example 2, wherein the memory controller is to configure the hardware multiplexer to provide access to a selected one of the first model or the second model.

Example 4 includes the apparatus of example 1, further including communication circuitry to transmit the second classification output to a remote system.

Example 5 includes the apparatus of example 4, wherein the communication circuitry is to transmit the first classification output to the remote system, the first classification output and the second classification output to be transmitted to the remote system in a single communication.

Example 6 includes the apparatus of example 1, wherein the classification controller is to normalize the first feature prior to applying the first model to the first feature.

Example 7 includes the apparatus of example 1, wherein the first feature and the second feature represent a same feature.

Example 8 includes the apparatus of example 1, further including a sensor interface to access the sensor data from a hardware sensor.

Example 9 includes at least one non-transitory machine readable medium comprising instructions that, when executed, cause at least one processor to at least select a first model to be utilized to classify a first feature identified from sensor data, move the first model to a first location accessible for execution by the at least one processor, apply the first model to the first feature to create a first classification output, the first classification output indicating an identified class, in response to a determination that the first classification output identifies a second model to be used for classification, move the second model to a second location accessible for execution to classify a second feature identified from the sensor data, and apply the second model to the second feature to create a second classification output.

Example 10 includes the at least one non-transitory machine readable medium of example 9, wherein the instructions, when executed, further cause the at least one processor to transmit the second classification output to a remote system.

Example 11 includes the at least one non-transitory machine readable medium of example 9, wherein the instructions, when executed, further cause the at least one processor configure a hardware multiplexer to provide selectable access to either the first location or the second location based on the model to be executed.

Example 12 includes the at least one non-transitory machine readable medium of example 9, wherein the first location is a same location as the second location.

Example 13 includes the at least one non-transitory machine readable medium of example 9, wherein the instructions, when executed, further cause the at least one processor to cause transmission of the second classification output to a remote system.

Example 14 includes the at least one non-transitory machine readable medium of example 13, wherein the instructions, when executed, cause the at least one processor to cause transmission of the first classification output to the remote system in a same communication as the second classification output.

Example 15 includes the at least one non-transitory machine readable medium of example 9, wherein the instructions, when executed, further cause the at least one processor to normalize the first feature prior to applying the first model to the first feature.

Example 16 includes the at least one non-transitory machine readable medium of example 9, wherein the first feature and the second feature represent a same feature.

Example 17 includes the at least one non-transitory machine readable medium of example 9, wherein the instructions, when executed, further cause the at least one processor to access the sensor data from a hardware sensor.

Example 18 includes an apparatus for conditional classifier chaining, the apparatus comprising means for selecting a first model to be utilized to classify a first feature identified from sensor data, means for copying the a first model into a memory, and means for applying the first model to the first feature to create a first classification output, the first classification output indicating an identified class, wherein the means for selecting is to, in response to a determination that the first classification output identifies a second model to be used for classification, instruct the means for copying to load the second model into the memory, the means for applying to apply the second model to a second feature to create a second classification output.

Example 19 includes the apparatus of example 18, wherein the means for copying is to copy the second model to the memory, and further including means for multiplexing the first model and the second model.

Example 20 includes the apparatus of example 19, wherein the means for copying is to configure the means for multiplexing to provide access to the one of the first model or the second model selected by the selecting means.

Example 21 includes the apparatus of example 18, further including means for communicating to transmit the second classification output to a remote system.

Example 22 includes the apparatus of example 21, wherein the means for communicating is to transmit the first classification output to the remote system, the first classification output and the second classification output to be transmitted to the remote system in a single communication.

Example 23 includes the apparatus of example 18, wherein the means for selecting is to normalize the first feature prior to applying the first model to the first feature.

Example 24 includes the apparatus of example 18, wherein the first feature and the second feature represent a same feature.

Example 25 includes the apparatus of example 18, further including means for accessing the sensor data from a hardware sensor.

Example 26 includes a method for conditional classifier chaining, the method comprising selecting a first model to be utilized to classify a first feature identified from sensor data, moving the first model to a first location accessible for execution, applying, by executing an instruction with at least one processor, the first model to the first feature to create a first classification output, the first classification output indicating an identified class, in response to a determination that the first classification output identifies a second model to be used for classification, moving the second model to a second location accessible for execution to classify a second feature identified from the sensor data, and applying, by executing an instruction with at least one processor, the second model to the second feature to create a second classification output, transmitting the second classification output to a remote system.

Example 27 includes the method of example 26, further including configuring a hardware multiplexer to provide access to a selected one of the first location or the second location.

Example 28 includes the method of example 26, wherein the first location is a same location as the second location.

Example 29 includes the method of example 26, further including transmitting the first classification output to the remote system.

Example 30 includes the method of example 29, wherein the first classification output and the second classification output are transmitted to the remote system in a single communication.

Example 31 includes the method of example 26, further including normalizing the first feature prior to applying the first model to the first feature.

Example 32 includes the method of example 26, wherein the first feature and the second feature represent a same feature.

Example 33 includes the method of example 26, further including accessing the sensor data from a hardware sensor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for conditional classifier chaining, the apparatus comprising:
  a memory controller to load a first machine learning model and a second machine learning model into a machine learning memory;
  a classification controller to select a first model to be utilized to classify a first feature identified from sensor data;
  a hardware multiplexer to provide selectable access to either the first model or the second model; and
  a machine learning processor to apply the first model to the first feature to create a first classification output, the first classification output indicating an identified class and a pointer to the second model, the classification controller to, in response to a determination that the first classification output includes the pointer to the second model, cause the hardware multiplexer to only allow access to the second model, the second model to be used for classification of a second feature to create a second classification output, wherein the second classification output is different from the first classification output.

2. The apparatus of claim 1, wherein the memory controller is to configure the hardware multiplexer to provide access to a selected one of the first model or the second model.

3. The apparatus of claim 1, further including communication circuitry to transmit the second classification output to a remote system.

4. The apparatus of claim 3, wherein the communication circuitry is to transmit the first classification output to the remote system, the first classification output and the second classification output to be transmitted to the remote system in a single communication.

5. The apparatus of claim 1, wherein the classification controller is to normalize the first feature prior to applying the first model to the first feature.

6. The apparatus of claim 1, wherein the first feature and the second feature represent a same feature.

7. The apparatus of claim 1, further including a sensor interface to access the sensor data from a hardware sensor.

8. At least one non-transitory machine readable medium comprising instructions that, when executed, cause at least one processor to at least:
    select a first model to be utilized to classify a first feature identified from sensor data;
    cause a hardware multiplexer to allow selectable access to either the first model or a second model for execution by the at least one processor;
    apply the first model to the first feature to create a first classification output, the first classification output indicating an identified class and a pointer to the second model;
    in response to a determination that the first classification output includes the pointer to the second model, cause the hardware multiplexer to only allow access to the second model, the second model to be used for classification of a second feature identified from the sensor data; and
    apply the second model to the second feature to create a second classification output, the second classification output being different from the first classification output.

9. The at least one non-transitory machine readable medium of claim 8, wherein the instructions, when executed, further cause the at least one processor to transmit the second classification output to a remote system.

10. The at least one non-transitory machine readable medium of claim 8, wherein the instructions, when executed, further cause the at least one processor configure the hardware multiplexer to provide selectable access to either the first model or the second model.

11. The at least one non-transitory machine readable medium of claim 8, wherein the first model and the second model are accessed via a same address via the hardware multiplexer.

12. The at least one non-transitory machine readable medium of claim 8, wherein the instructions, when executed, further cause the at least one processor to cause transmission of the second classification output to a remote system.

13. The at least one non-transitory machine readable medium of claim 12, wherein the instructions, when executed, cause the at least one processor to cause transmission of the first classification output to the remote system in a same communication as the second classification output.

14. The at least one non-transitory machine readable medium of claim 8, wherein the instructions, when executed, further cause the at least one processor to normalize the first feature prior to applying the first model to the first feature.

15. The at least one non-transitory machine readable medium of claim 8, wherein the first feature and the second feature represent a same feature.

16. The at least one non-transitory machine readable medium of claim 8, wherein the instructions, when executed, further cause the at least one processor to access the sensor data from a hardware sensor.

17. An apparatus for conditional classifier chaining, the apparatus comprising:
    means for copying a first model and a second model into a memory;
    means for selecting the first model to be utilized to classify a first feature identified from sensor data;
    means for multiplexing to provide selectable access to either the first model or the second model; and
    means for applying the first model to the first feature to create a first classification output, the first classification output indicating an identified class and a pointer to the second model, wherein the means for selecting is to, in response to a determination that the first classification output includes the pointer to the second model, cause the means for multiplexing to only allow access to the second model, the second model to be used for classification of a second feature to create a second classification output, wherein the second classification output is different from the first classification output.

18. The apparatus of claim 17, further including means for communicating to transmit the second classification output to a remote system.

19. The apparatus of claim 18, wherein the means for communicating is to transmit the first classification output to the remote system, the first classification output and the second classification output to be transmitted to the remote system in a single communication.

20. The apparatus of claim 17, wherein the means for selecting is to normalize the first feature prior to applying the first model to the first feature.

21. The apparatus of claim 17, wherein the first feature and the second feature represent a same feature.

22. The apparatus of claim 17, further including means for accessing the sensor data from a hardware sensor.

23. A method for conditional classifier chaining, the method comprising:
    selecting a first model to be utilized to classify a first feature identified from sensor data;
    causing a hardware multiplexer to allow selectable access to either the first model or a second model;
    applying, by executing an instruction with at least one processor, the first model to the first feature to create a first classification output, the first classification output indicating an identified class and a pointer to the second model;
    in response to a determination that the first classification output includes the pointer to the second model, causing the hardware multiplexer to only allow access to the second model, the second model to be used for classification of a second feature identified from the sensor data; and
    applying, by executing an instruction with the at least one processor, the second model to the second feature to create a second classification output, the second classification output being different from the first classification output.

24. The method of claim 23, further including transmitting the second classification output to a remote system.

25. The method of claim 23, wherein the first model and the second model are accessed via a same address via the hardware multiplexer.

* * * * *